United States Patent
Arai et al.

(10) Patent No.: US 8,159,176 B2
(45) Date of Patent: Apr. 17, 2012

(54) MOTOR DRIVING DEVICE

(75) Inventors: Mitsuji Arai, Oizumi-machi (JP);
Takeshi Oike, Oizumi-machi (JP)

(73) Assignees: Sanyo Electric Co., Ltd., Osaka (JP);
Sanyo Semiconductor Co., Ltd., Gunma (JP)

( * ) Notice: Subject to any disclaimer, the term of this patent is extended or adjusted under 35 U.S.C. 154(b) by 123 days.

(21) Appl. No.: 12/856,362

(22) Filed: Aug. 13, 2010

(65) Prior Publication Data

US 2011/0025251 A1 Feb. 3, 2011

Related U.S. Application Data

(63) Continuation of application No. PCT/JP2008/052344, filed on Feb. 13, 2008.

(51) Int. Cl.
*G05B 19/40* (2006.01)

(52) U.S. Cl. ......... 318/685; 318/684; 318/596; 318/672

(58) Field of Classification Search ............... 318/685, 318/684, 596, 599, 635, 672
See application file for complete search history.

(56) References Cited

U.S. PATENT DOCUMENTS

| | | | | |
|---|---|---|---|---|
| 4,710,686 A * | 12/1987 | Guzik | ........................... | 318/293 |
| 5,032,780 A * | 7/1991 | Hopkins | ....................... | 318/696 |
| 5,530,332 A * | 6/1996 | Rees | ............................... | 318/685 |
| 5,625,269 A * | 4/1997 | Ikeda | ............................. | 318/696 |
| 7,298,283 B2 * | 11/2007 | Takahashi et al. | ............. | 340/679 |

FOREIGN PATENT DOCUMENTS

| | | |
|---|---|---|
| JP | 02-303398 | 12/1990 |
| JP | 2006/25575 | 1/2006 |
| JP | 2007-124849 | 5/2007 |

OTHER PUBLICATIONS

Patent Abstracts of Japan for patent application with Publication No. 2007-124849 Publication Date: May 17, 2007 1 page.

(Continued)

*Primary Examiner* — Walter Benson
*Assistant Examiner* — Thai Dinh
(74) *Attorney, Agent, or Firm* — Osha Liang LLP

(57) ABSTRACT

A motor-driving device comprising: a switching element to control a current passed through a first coil of a stepping motor including the first and a second coils electromagnetically coupled; a rectifier element to be energized in a ground-side-to-second-coil direction; a coil-current-detection unit to detect a current passed through the first coil; a regeneration-current-detection unit to detect a current passed through the rectifier element; a control unit to turn off the switching element when the current passed through the first coil reaches a predetermined-set current based on a detection result of the coil-current-detection unit; and a negative-current-detection unit to detect whether a negative current greater in absolute value than a predetermined-set value is passed through the rectifier element based on a detection result of the regeneration-current-detection unit, the control unit keeping the switching element off when the negative current is not passed, based on a detection result of the negative-current-detection unit.

5 Claims, 10 Drawing Sheets

OTHER PUBLICATIONS

Mechanical English translation of Patent Application with Publication No. 2007-124849, Publication Date: May 17, 2007, 14 pages.
Patent Abstracts of Japan for patent application with Publication No. 2006-025575, Publication Date: Jan. 26, 2006, 1 page.
Mechanical English translation of Patent Application with Publication No. 2006-025575, Publication Date: Jan. 26, 2006, 18 pages.
Patent Abstracts of Japan for patent application with Publication No. 02-303398, Publication Date: Dec. 17, 1990 1 page.

* cited by examiner

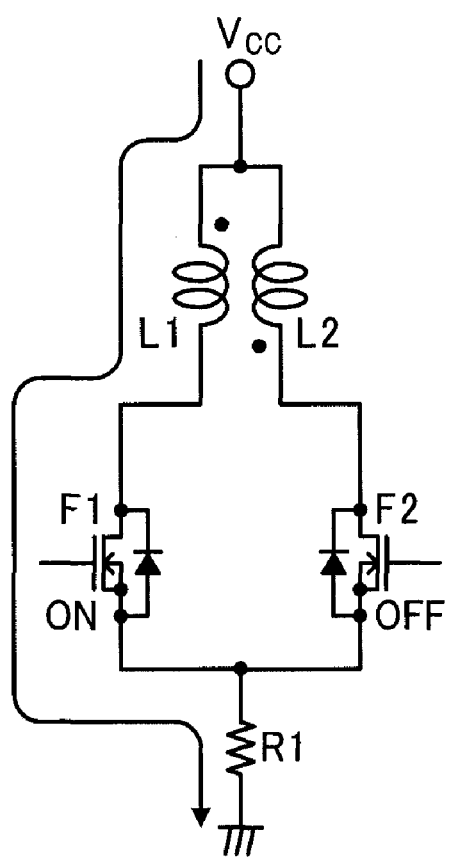
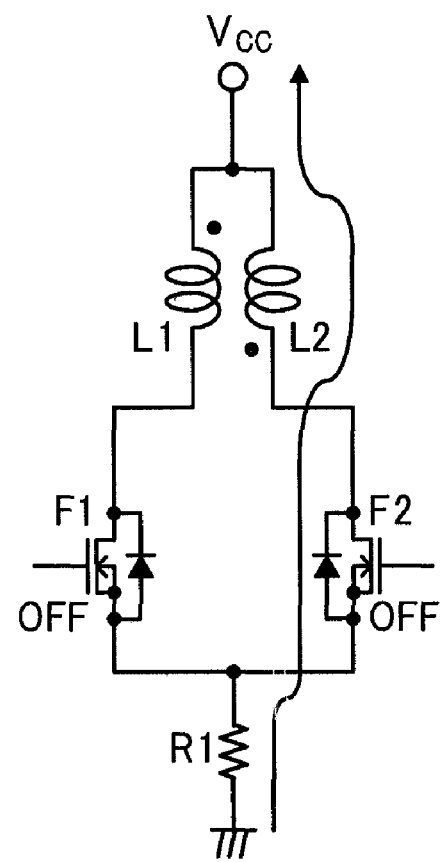
FIG. 7A
FIG. 7B

MOTOR DRIVING DEVICE

CROSS-REFERENCE TO RELATED APPLICATION

This is a continuation application which claims the benefit of priority to International Patent Application No. PCT/JP2008/52344, filed Feb. 13, 2008. The full contents of the International Patent Application are incorporated herein by reference.

BACKGROUND OF THE INVENTION

1. Field of the Invention

The present invention relates to a motor driving device.

2. Description of the Related Art

A stepping motor is used for controlling various electronic devices in positioning of a carriage in a printer or the like. FIG. 6 is a diagram illustrating an example of a common motor driving device for driving a two-phase stepping motor. A motor M includes coils L1 and L2 creating an A-phase magnetic field and coils L3 and L4 creating a B-phase magnetic field, and a motor driving device 100 is provided in order to control driving of the motor M. The motor driving device 100 is configured with switching elements F1 to F4 for controlling an electric current passed through the coils L1 to L4, an output control unit 102 for controlling on/off of the switching elements F1 to F4, resistors R1 and R2 for detecting an electric current passed through the coils L1 to L4, and a current detecting unit 104 for detecting whether or not a current passed through the coils L1 to L4 has reached a predetermined current.

For example, the output control unit 102 passes a current through the motor coil L1 by turning on the switching element F1. A current passed through the coil L1 is increased as time elapses, and a current detecting voltage occurring at one end of the resistor R1 is also increased. Then, when the current detecting unit 104 detects that the current detecting voltage has become higher than a predetermined reference voltage $V_{REF}$, the output control unit 102 determines that a current passed through the coil L1 has reached the predetermined current and turns off the switching element F1. Thereafter as well, the output control unit 102 repeats on/off of the switching element F1. Also, the other switching elements F2 to F4 are similarly controlled. That is, in the motor driving device 100, an amount of a current passed through the coils L1 to L4 is adjusted by PWM (Pulse Width Modulation) control.

In the motor M, a single pair of transformer structures is formed by the A-phase coils L1 and L2, and a single pair of the transformer structures is formed by the B-phase coils L3 and L4. Therefore, when the switching element F1 is on/off, for example, as shown in FIG. 7A, a current is passed through the coil L1 and energy is accumulated in a period when the switching element F1 is on, while as shown in FIG. 7B, the energy accumulated in the coil L1 is transferred to the coil L2 when the switching element F1 is turned off, and a regeneration current is passed through a path from a parasitic diode of the switching element F2 to the coil L2, so that the energy is consumed. That is, as shown in FIG. 8, a current $I_D$ passed through the switching element F1 is increased during the period when the switching element F1 is on, and when the switching element F1 is turned off, the current $I_D$ is immediately decreased, and a drain-source voltage $V_{DS}$ of the switching element F1 is increased. Also, when the switching element F2 is on/off, the energy accumulated in the coil L2 during the period when the switching element F2 is on is transferred to the coil L1 when the switching element F2 is turned off and a current is passed through a path from the parasitic diode of the switching element F1 to the coil L1, so that the energy is consumed. The same applies to the B-phase coils L3 and L4.

As mentioned above, with on/off of the switching elements F1 to F4, energy is transferred between the coils L1 and L2 and between the coils L3 and L4. Thus, if the coil L2 is disconnected from the motor driving device 100 due to a poor connection or the like, for example, when the switching element F1 is turned off after being on, the energy accumulated in the coil L1 is not transferred to the coil L2. In this case, as shown in FIG. 9, when the switching element F1 is turned off, the drain-source voltage $V_{DS}$ of the switching element F1 is increased to an extremely high level and an avalanche state is brought about in the switching element F1. Then, the energy accumulated in the coil L1 is absorbed in the switching element F1 as avalanche energy and is slowly consumed by an avalanche current passed through the switching element F1. If such an avalanche state occurs, the drain-source voltage $V_{DS}$ of the switching element F1 becomes extremely increased, and thus, if on/off of the switching element F1 is repeated in a state where the coil L2 is disconnected from the motor driving device 100, a junction part of the switching element F1 is increased in temperature and might be thermally destructed.

Therefore, a motor driving device having a function of preventing such thermal destruction of the switching element might be used (See Japanese Patent Laid-Open Publication No. 2007-124849, for example). FIG. 10 is a diagram illustrating a configuration example of the motor driving device having the function of preventing thermal destruction of the switching element. A motor driving device 120 further includes a current detection unit 122 for detecting the presence or absence of an avalanche current in addition to the configuration of the motor driving device 100.

In the motor driving device 120, if the avalanche current is detected on the basis of a detection result of the current detection unit 122, the switching elements F1 to F4 are kept off, to suppress the occurrence of the avalanche state. Specifically, as shown in FIG. 11, if the switching element F1 repeats on/off while the coil L2 is connected to the motor driving device 120, for example, the current detecting voltage $V_{R1}$ occurring at one end of the resistor R1 is changed so as to be increased to $V_{REF1}$ during the period when the switching element F1 is on, and to rapidly become a negative voltage when the switching element F1 is turned off. On the other hand, if the coil L2 is disconnected from the motor driving device 120, even if the switching element F1 is turned off, the current detecting voltage $V_{R1}$ is not rapidly decreased but slowly decreased. Thus, in the motor driving device 120, a reference voltage $V_{REF2}$ lower than the reference voltage $V_{REF1}$ is compared with the current detecting voltage $V_{R1}$ in the current detection unit 122. The output control unit 102 determines, on the basis of the detection result of the current detection unit 122, that the avalanche current has occurred when the current detecting voltage $V_{R1}$ is higher than the reference voltage $V_{REF2}$ after a predetermined time has elapsed since the switching element F1 was turned off, and the output control unit 102 keeps the switching element off. When the switching elements F2 to F4 are on/off, the avalanche current is detected through a similar operation.

As mentioned above, in the motor driving device 120, whether or not the coils L1 to L4 are disconnected from the motor driving device 120 is detected using the avalanche current. However, since a change, in a current passed through the switching elements F1 to F4 after the switching elements F1 to F4 are turned off after being on, is different depending on a motor specification, even if the coils L1 to L4 are normally connected to the motor driving device 120, there might be such false detection that the coils L1 to L4 are disconnected from the motor driving device 120. For example, if a hybrid motor and a PM (Permanent Magnet) motor are compared, coupling between the coils L1 and L2 and the coils L3 and L4 might become poorer in the PM motor due to variations in product characteristics. Thus, in the case of the hybrid motor, the current $I_D$ passed through the switching element F1 is rapidly decreased if the switching element F1 is turned off after being on as shown in FIG. 12, while in the case of the PM motor, the current $I_D$ may keep being passed through the switching element F1 for a while even after the switching element F1 is turned off as shown in FIG. 13. Therefore, in such a PM motor, in the case where detection of the avalanche current is executed, before the switching element is turned off and the current is fully decreased, there might be false detection of coil disconnection.

Thus, in order to prevent the false detection of the coil disconnection in the PM motor in which a current is slowly decreased after the switching element is turned off, timing needs to be delayed of detection of the avalanche current after the switching element is turned off after being on. However, if the detection timing of the avalanche current is delayed, the avalanche state cannot be detected in the case of the hybrid motor with a relatively short time period of the avalanche state when the coil is disconnected.

SUMMARY OF THE INVENTION

A motor driving device according to an aspect of the present invention, comprises: a switching element having one end connected to one end of a first coil of a stepping motor including the first coil and a second coil, and having the other end connected to a ground side, the switching element configured to control a current passed through the first coil, the other end of the first coil and one end of the second coil electromagnetically coupled and connected to a power source side; a rectifier element having one end connected to the other end of the second coil, and having the other end connected to the ground side, the rectifier element configured to be energized in a direction from the ground side toward the second coil; a coil current detection unit configured to detect a current passed through the first coil; a regeneration current detection unit configured to detect a current passed through the rectifier element; a control unit configured to turn on the switching element at predetermined intervals, and turn off the switching element when the current passed through the first coil reaches a predetermined set current based on a detection result of the coil current detection unit; and a negative current detection unit configured to detect whether or not a negative current greater in absolute value than a predetermined set value is passed through the rectifier element based on a detection result of the regeneration current detection unit during a period when the switching element is off after being on, the control unit keeping the switching element off when the negative current is not passed therethrough, based on a detection result of the negative current detection unit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4 is a diagram illustrating an example of a change in voltage $V_{R1}$ when a switching element is turned off after being on;

FIG. 7A is a diagram illustrating a current path according to a state of a switching element;

FIG. 7B is a diagram illustrating a current path according to a state of a switching element;

DETAILED DESCRIPTION OF THE INVENTION

At least the following details will become apparent from descriptions of this specification and of the accompanying drawings.

Figure 1:
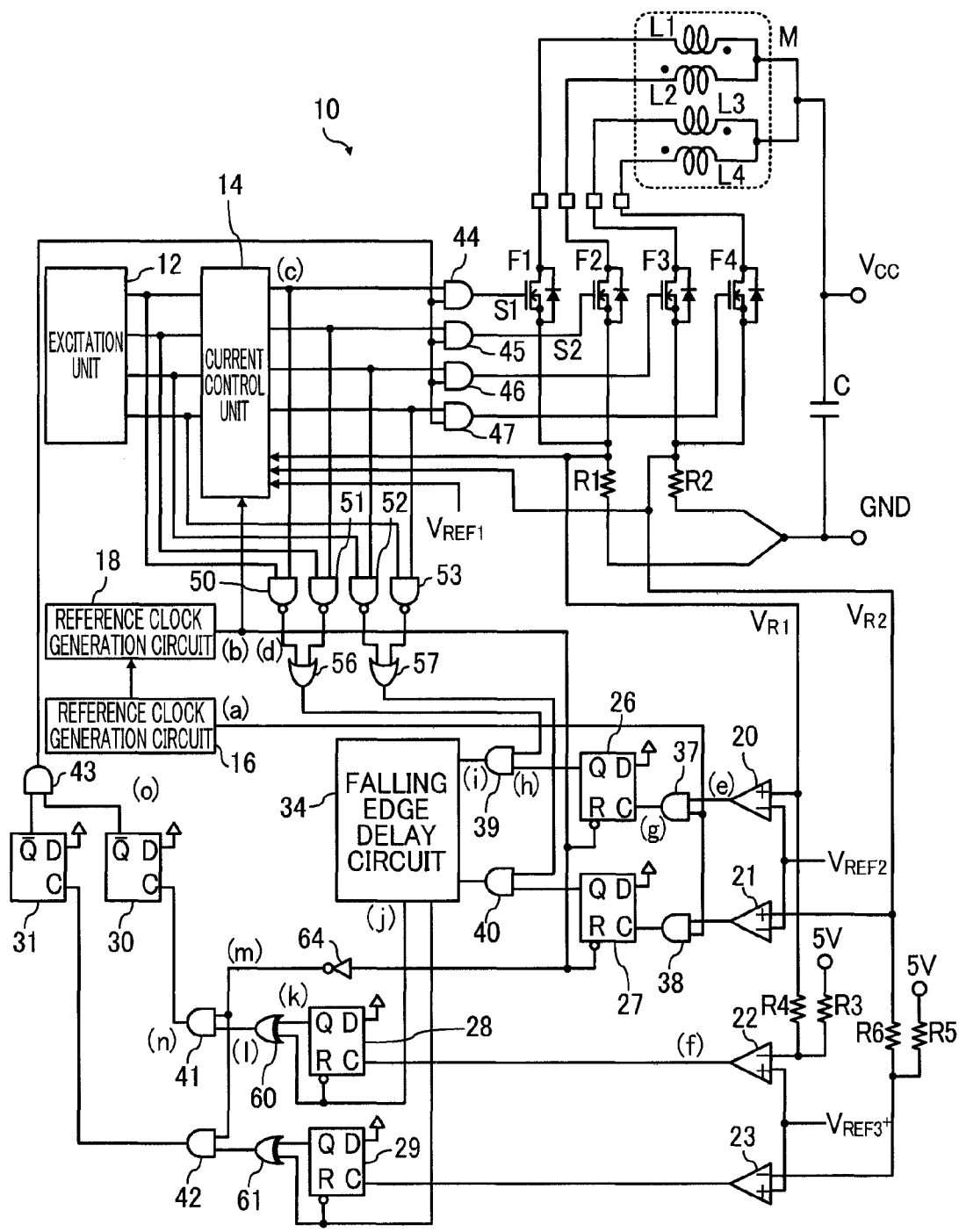
FIG. 1 is a diagram illustrating a configuration of a motor driving device according to an embodiment of the present invention.

FIG. 1 is a diagram illustrating a configuration of a motor driving device according to an embodiment of the present invention. A motor driving device 10 is integrated and drives a motor M connected through a connecting terminal.

The motor M is a two-phase unipolar stepping motor including coils L1 to L4. The coils L1 and L2 are wound around the same stator in directions opposite to each other and electromagnetically coupled, to create an A-phase magnetic field. Similarly, the coils L3 and L4 are wound around the same stator in directions opposite to each other and electromagnetically coupled, to create a B-phase magnetic field. In the coils L1 to L4, a power voltage $V_{CC}$ of 24V is applied to each one end thereof, and the other ends thereof is connected to switching elements F1 to F4 through connecting terminals, respectively, for example.

The switching elements F1 to F4 are elements for controlling energization in the coils L1 to L4 and are realized by an N-channel MOSFET in an embodiment of the present invention. Between drains and sources of the switching elements F1 to F4, parasitic diodes are formed with a direction from the ground side to the power supply side as a forward direction.

A resistor R1 is an object for detecting a current passed through the coils L1 and L2, and has one end thereof connected to the sources of the switching elements F1 and F2 and the other end thereof is grounded. Also, a resistor R2 is an object for detecting a current passed through the coils L3 and L4, and has one end thereof connected to the sources of the switching elements F3 and F4 and the other end thereof is grounded. Therefore, at connection points between the resistors R1 and R2 and the switching elements F1 to F4, voltages $V_{R1}$ and $V_{R2}$ (first detection voltage) according to the current passed through the coils L1 to L4 are generated. Also, when a regeneration current is passed through the parasitic diodes of the switching elements F1 to F4 from the ground side, voltages $V_{R1}$ and $V_{R2}$ (second detection voltage) according to the regeneration current is generated. The resistors R1 and R2 correspond to a coil current detection unit and a regeneration current detection unit.

An excitation unit 12 outputs an excitation signal for controlling energization of the coils L1 to L4 according to an excitation method such as 2-phase excitation, 1-2 phase excitation and the like. Then, each time the excitation signal outputted from the excitation unit 12 is switched, the motor M is rotated by a predetermined angle. A signal for controlling a rotation speed of the motor M is inputted to the excitation unit 12 from an external microcomputer or the like, and a pulse width of the excitation signal outputted from the excitation unit 12 is in accordance with the rotation speed.

A current control unit 14 (control unit) compares the voltages $V_{R1}$ and $V_{R2}$ with a predetermined reference voltage $V_{REF1}$, and controls on/off of the switching elements F1 to F4 so that the current passed through the coils L1 to L4 becomes a predetermined set current according to the reference voltage $V_{REF1}$. For example, such processing is repeated that when a current is passed through the coil L1 according to the excitation signal from the excitation unit 12, the current control unit 14 outputs such a signal as to turn on the switching element F1 and pass a current through the coil L1, and when the voltage $V_{R1}$ has reached the reference voltage $V_{REF1}$, the control unit outputs such a signal as to turn off the switching element F1, and after the switching element F1 is turned off, the control unit outputs such a signal as to turn on the switching element F1 again in predetermined timing. If the switching element F1 is turned off after being on, energy accumulated in the coil L1 is transferred to the coil L2, and a negative current (regeneration current) is passed through the coil L2 via the parasitic diode (rectifier element) of the switching element F2. The maximum absolute value of the negative current is approximately equal to the maximum value of the current passed through the coil L1. Similarly, when the switching element F2 is turned off after being on, a negative current is passed through the coil L1 via the parasitic diode of the switching element F1. The same applies to a case of on/off of the switching elements F3 and F4. As such, since the switching elements F1 to F4 are PWM-controlled, a current passed through the coils L1 to L4 is controlled so as to become a predetermined set current according to the reference voltage $V_{REF1}$.

A reference clock generation circuit 16 generates a clock signal of a predetermined frequency to be used as a reference of timing of turning on of the switching elements F1 to F4 when the current control unit 14 PWM-controls the switching elements F1 to F4. In an embodiment of the present invention, at falling timing of the clock signal outputted from the reference clock generation circuit 16, the switching elements F1 to F4 are turned on. Also, the reference clock generation circuit 18 generates such a clock signal that has the same falling timing as that of the clock signal outputted from the reference clock generation circuit 16 and that rises prior to the clock signal outputted from the reference clock generation circuit 16.

Comparison circuits 20 to 23, flip-flops (FF) 26 to 31, a falling edge delay circuit 34, AND circuits 37 to 47, NAND circuits 50 to 53, OR circuits 56 and 57, EXOR circuits 60 and 61, a NOT circuit 64, and resistors R3 to R6 make up a negative-current detection unit for detecting whether or not a negative current greater in absolute value than a predetermined set value is passed through the switching elements F1 to F4 during a period when the switching elements F1 to F4 are off after being on. If the negative current greater than the predetermined set value is not passed, it is determined that the coils L1 to L4 are not normally connected to the motor driving device 10, a signal outputted from the AND circuit 43 becomes L level, and a signal outputted from the AND circuits 44 to 47 all become L level, so that the switching elements F1 to F4 are all kept off. A circuit made up of the FFs 26 to 31, the falling edge delay circuit 34, the AND circuits 37 to 47, the NAND circuits 50 to 53, the OR circuits 56 and 57, the EXOR circuits 60 and 61, and the NOT circuit 64 corresponds to a stop-signal output circuit. Also, a circuit made up of the comparison circuits 20 and 21, the FFs 26 and 27, and the AND circuits 37 to 40 corresponds to a set-current detection circuit.

For example, in the case where the switching element F1 is on/off, if the switching element F1 is turned off after being on, the negative current is passed through the coil L2 via the resistor R1 and the parasitic diode of the switching element F2 when the coil L2 is normally connected to the motor driving device 10. At this time, the voltage $V_{R1}$ is a negative voltage according to magnitude of the negative current. The comparison circuit 22 outputs a signal indicating whether or not the negative current greater than the predetermined set value is passed on the basis of the voltage $V_{R1}$. Specifically, in the comparison circuit 22, a voltage obtained by dividing a positive voltage of 5V and the voltage $V_{R1}$ by the resistors R3 and R4 is compared with a predetermined reference voltage $V_{REF3}+$, for example. That is, when the voltage occurs at the connection point of the resistors R3 and R4 become lower than the predetermined reference voltage $V_{REF3+}$, it is determined that the negative current greater than the predetermined set value is passed. The resistors R3 and R4 make up a level shift circuit for level-shifting the voltage $V_{R1}$ so that the voltage at the connection point of the resistors R3 and R4 becomes the voltage $V_{REF3+}$ when the voltage $V_{R1}$ is the reference voltage $V_{REF3}$ of the negative level, in order for the comparison circuit 22 to be able to compare voltages at a positive level. The resistors R5 and R6 also make up a level shift circuit for level-shifting the voltage $V_{R2}$. In the case where the switching elements F2 to F4 are on/off as well, the negative current is detected.

Here, since the maximum absolute value of the negative current, generated when the switching elements F1 to F4 are turned off after being on, is approximately equal to the maximum value of the positive current passed through the coils L1 to L4 according to the reference voltage $V_{REF1}$, when the reference voltage $V_{REF1}$ is low, the maximum absolute value of the negative current also becomes small, and even if the coils L1 to L4 are normally connected to the motor driving device 10, the negative current according to the reference voltage $V_{REF3}$ is not generated, so that there is a possibility that it is determined that the coils L1 to L4 are disconnected from the motor driving device 10. Thus, in the motor driving device 10, only when the maximum value of the positive current passed through the coils L1 to L4 is greater than the predetermined level, the switching elements F1 to F4 are turned off on the basis of such determination that the coils L1 to L4 are disconnected. Specifically, based on whether or not the voltages $V_{R1}$ and $V_{R2}$ are higher than the predetermined reference voltage $V_{REF2}$ greater in absolute value than the reference voltage $V_{REF3}$ during a period when the switching elements F1 to F4 are on, it is determined whether or not the maximum value of the positive current passed through the coils L1 to L4 is greater than the predetermined level. For example, in the case where the switching element F1 is on/off, the voltage $V_{R1}$ and the reference voltage $V_{REF2}$ are compared in the comparison circuit 20. That is, when the voltage $V_{R1}$ becomes higher than the reference voltage $V_{REF2}$ it is determined that the maximum value of the positive current passed through the coil L1 has become greater than the predetermined level. The same applies to the case where the switching elements F2 to F4 are on/off.

Referring to a timing chart shown in FIG. 2, an outline will be described of an operation of the motor driving device 10 when the coils L1 to L4 are normally connected. In the timing chart in FIG. 2, the currents passed through the coils L1 and L2 are represented by $I_A$ and $I_{AB}$, and signals inputted to gates of the switching elements F1 and F2 are represented by S1 and S2.

Figure 2:
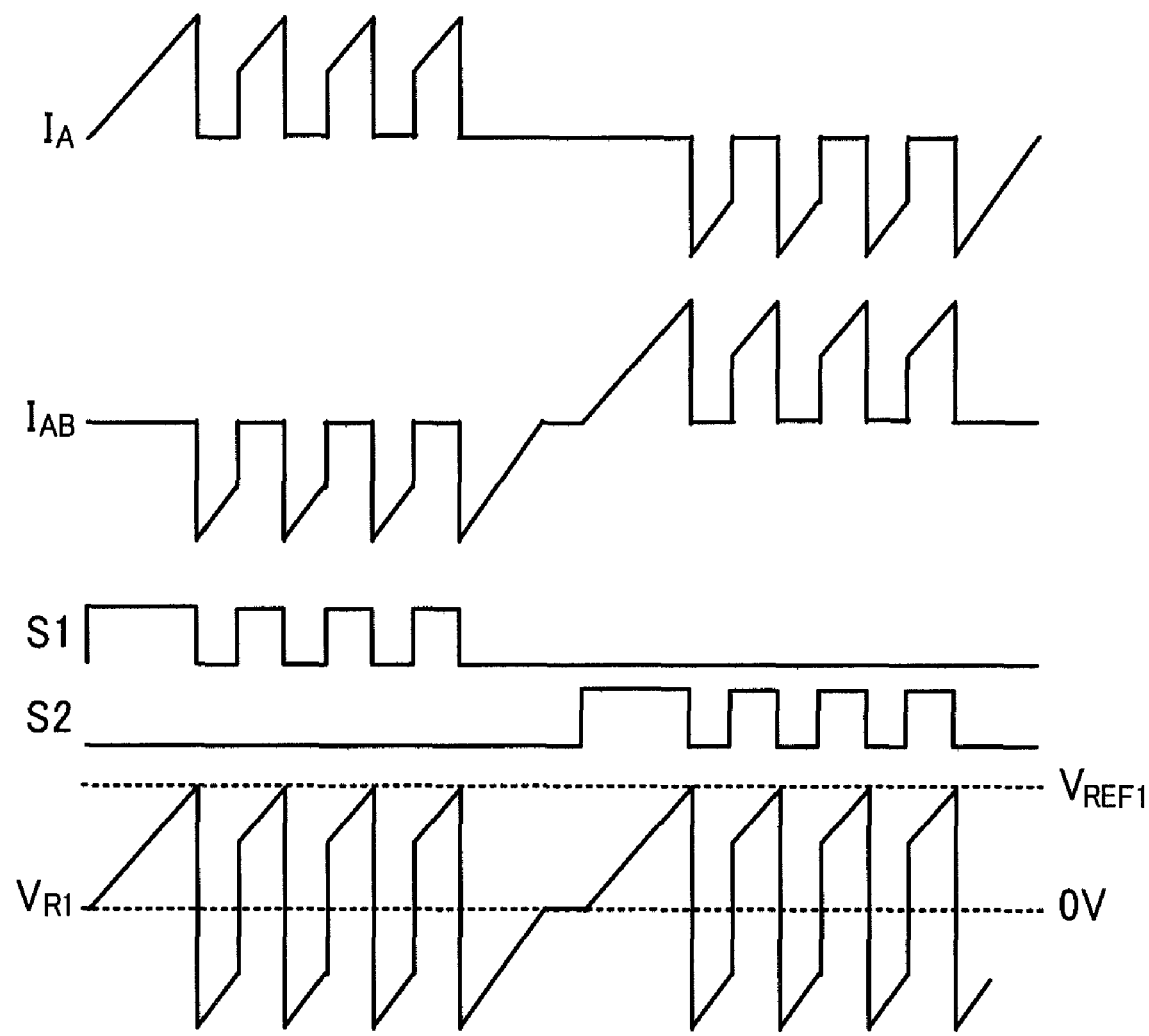
FIG. 2 is a diagram illustrating an outline of an operation of a motor driving device when a coil is normally connected.

In an example in FIG. 2, first, it is assumed that an excitation signal for instructing energization of the coil L1 is outputted from the excitation unit 12. Therefore, the signal S1 outputted to the switching element F1 becomes H level, and as the current $I_A$ is increased, the voltage $V_{R1}$ is increased. When the voltage $V_{R1}$, has reached the reference voltage $V_{REF1}$, the current control unit 14 changes the signal S1 to L level, and the switching element F1 is turned off. When the switching element F1 is turned off, the current $I_A$ is rapidly decreased as well as energy accumulated in the coil L1 is transferred to the coil L2, so that a negative current $I_{AB}$ is passed from the parasitic diode of the switching element F2 toward the coil L2, and the voltage $V_{R1}$ also becomes a negative voltage according to the current $I_{AB}$. Thereafter, when the current control unit 14 changes the signal S1 again to H level on the basis of the clock signal outputted from the reference clock generation circuit 16, the current $I_A$ is increased. As such, during the period when the excitation signal for instructing energization of the coil L1 is outputted, the switching element F1 is PWM-controlled so that the maximum value of a current passed through the coil L1 becomes the predetermined set current according to the reference voltage $V_{REF1}$.

Also, in the example in FIG. 2, it is assumed that an excitation signal for instructing energization of the coil L2 subsequent to the coil L1 is outputted from the excitation unit 12. In the period when the excitation signal for instructing energization of the coil L2 is outputted as well, the switching element F2 is PWM-controlled so that the maximum value of a current passed through the coil L2 becomes the predetermined set current according to the reference voltage $V_{REF1}$, as in the case of the coil L1. If the switching element F2 is PWM-controlled, when the switching element F2 is turned off after being on, the negative current $I_A$ is passed from the parasitic diode of the switching element F1 to the coil L1, and the voltage $V_{R1}$ becomes the negative voltage according to the current $I_A$.

Referring to a timing chart shown in FIG. 3, an example will be described of an operation of the motor driving device 10 when the coil L2 is disconnected during a period when the switching element F1 is on/off. First, it is assumed that the coil L2 is normally connected to the motor driving device 10 as an initial state. As mentioned above, a clock signal a having a predetermined frequency used as a reference of the PWM control is outputted from the reference clock generation circuit 16, and such a clock signal b that has the same falling timing as that of the clock signal a and that rises prior to the clock signal a is outputted from the reference clock generation circuit 18. When the excitation signal for instructing energization of the coil L1 is outputted from the excitation unit 12, a signal c outputted from the current control unit 14 becomes H level, and the switching element F1 is turned on. When the switching element F1 is turned on, the voltage $V_{R1}$ is increased, and when the voltage has reached the reference voltage $V_{REF1}$, the signal c outputted from the current control unit 14 becomes L level. When the signal c becomes L level, the switching element F1 is turned off. In a state where the coil L2 is normally connected, a negative current is passed through the parasitic diode of the switching element F2, and the voltage $V_{R1}$ is decreased to the negative voltage approximately equal in absolute value to the reference voltage $V_{REF1}$. In an example in FIG. 3, the reference voltage $V_{REF1}$ is higher than the reference voltage $V_{REF2}$, and the voltage $V_{R1}$ of a negative level generated when the coil L2 is normally connected is lower than the reference voltage $V_{REF3}$.

Since the H-level signal for controlling energization of the coil L1 outputted from the excitation unit 12 and the signal c outputted from the current control unit 14 are inputted to the NAND circuit 50, a signal d outputted from the NAND circuit 50 is an inverted signal of the signal c. Also, since the reference voltage $V_{REF1}$ is higher than the reference voltage $V_{REF2}$, a signal outputted from the comparison circuit 20 is kept at H level during a period when the voltage $V_{R1}$ is higher than the reference voltage $V_{REF2}$. A signal f outputted from the comparison circuit 22 becomes H level during a period when the voltage $V_{R1}$ is lower than the reference voltage $V_{REF3}$. Therefore, if such a period occurs the signal f becomes H level during a period when the switching element F1 is off, the coil L2 is normally connected, and energy, accumulated in the coil L1 by the negative current passed through the parasitic diode of the switching element F2, is consumed. Due to response delay of the switching element F1, the signal f is changed after a delay time Td has elapsed from the falling edge of the signal c.

The clock signal a and the signal e outputted from the comparison circuit 20 are inputted to the AND circuit 37. Therefore, a signal g outputted from the AND circuit 37 becomes H level during a period when the voltage $V_{R1}$ is higher than the reference voltage $V_{REF2}$ from the rising edge of the clock signal a. Then, the signal g is inputted to a clock input terminal C of the FF 26, and the clock signal b is inputted to a reset terminal R of the FF 26. Therefore, a signal h outputted from an output terminal Q of the FF 26 is reset to L level at the falling edge of the clock signal b, and then, the signal becomes H level at the rising edge of the signal g. That is, the signal h is kept at H level during a period from the rising edge to the falling edge of the clock signal a when the reference voltage $V_{REF1}$ is higher than the reference voltage $V_{REF2}$.

The signal d outputted from the OR circuit 56 and the signal h outputted from the FF 26 are inputted to the AND circuit 39. Since the signal d is H level during a period when the switching element F1 is off, a signal i outputted from the AND circuit 39 is H level during a period when the switching element F1 is off in a state where the switching element F1 is PWM-controlled with the reference voltage $V_{REF1}$ being higher than the reference voltage $V_{REF2}$.

A signal j outputted from the falling edge delay circuit 34 is a signal obtained by delaying the falling edge of the signal outputted from the AND circuit 39 by a micro time. Then, the signal f outputted from the comparison circuit 22 is inputted to the clock input terminal C of the FF 28, and the signal j outputted from the falling edge delay circuit 34 is inputted to the reset terminal R of the FF 28. Therefore, a signal k outputted from the output terminal Q of the FF 28 becomes H level when the voltage $V_{R1}$ becomes lower than the reference voltage $V_{REF3}$ during a period when the switching element F1 is off, and then, the signal becomes L level after a micro time since the switching element F1 was turned on. That is, the signal k indicates whether or not a normal regeneration current has been generated during a period when the switching element F1 is off after being on.

The signal k outputted from the FF 28 and the signal j outputted from the falling edge delay circuit 34 are inputted to the EXOR circuit 60. Therefore, when the coil L2 is normally connected, a signal 1 outputted from the EXOR circuit 60 becomes H level only during a period of the micro delay time Td from the rising edge of the signal j to the rising edge of the signal k.

A signal m obtained by inversing the clock signal b at the NOT circuit 64 and the signal 1 outputted from the EXOR circuit 60 are inputted to the AND circuit 41. When the coil L2 is normally connected, a period when the signal 1 is H level is only the micro time Td and does not overlap with the period when the signal m is H level, and a signal n is kept at L level.

The FF 30 has been reset as an initial state, and a signal o outputted from an inverting output terminal /Q is H level. When the coil L2 is normally connected, since the signal n inputted to the clock input terminal C is kept at L level, the signal o is kept at H level. Therefore, the signal outputted from the AND circuit 44 varies according to the signal c outputted from the current control unit 14, and the switching element F1 is turned on/off on the basis of the clock signal b.

Figure 3:
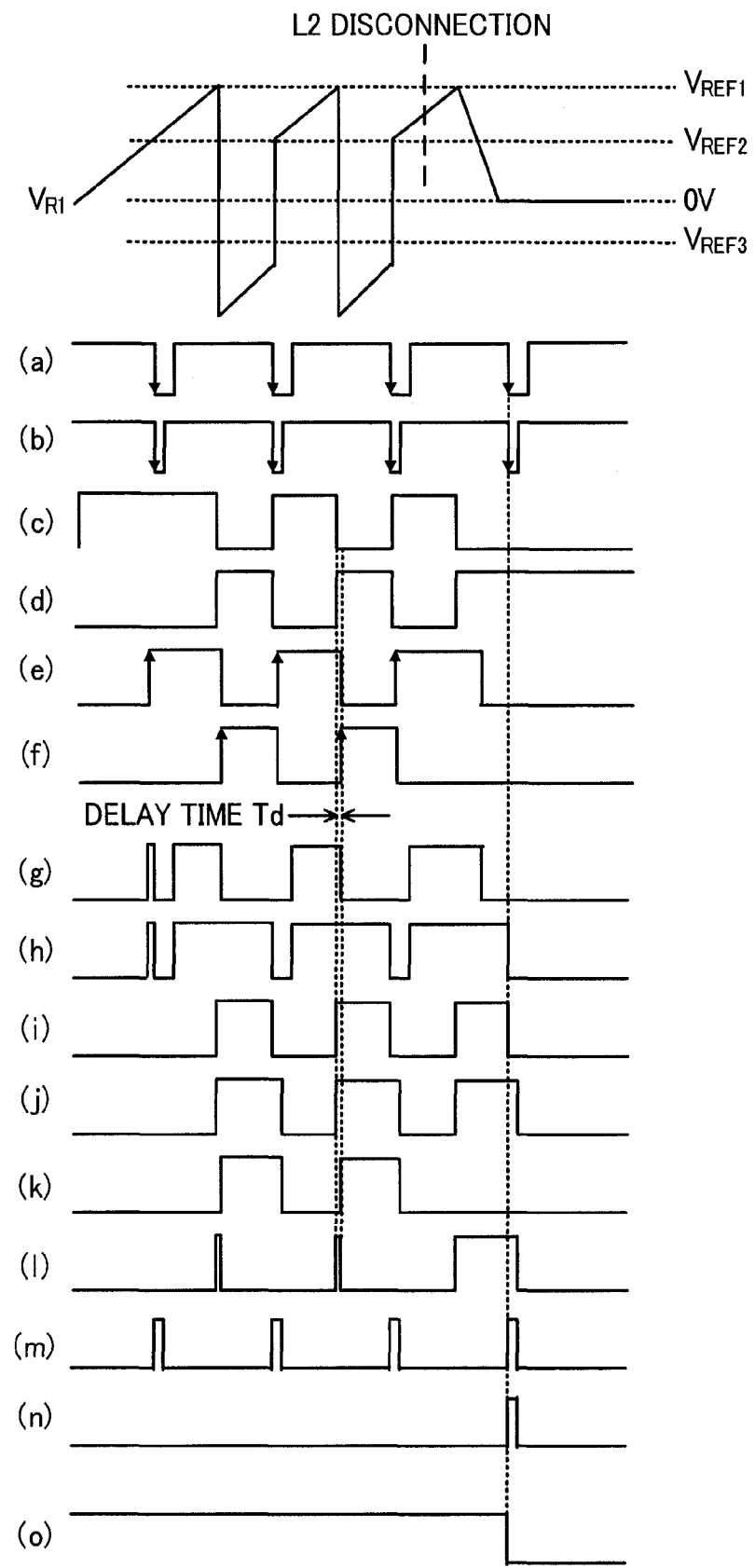
FIG. 3 is a diagram illustrating an example of an operation of a motor driving device when the coil is disconnected while a switching element is on/off.

Thereafter, as shown in FIG. 3, it is assumed that the coil L2 is disconnected from the motor driving device 10 while the switching element F1 is on/off. When coil L2 is disconnected, the regeneration current is not generated even if the switching element F1 is turned off after being on, and such a state does not occur that the voltage $V_{R1}$ is lower than the reference voltage $V_{REF3}$ during a period till the falling edge of the clock signal b at which the switching element F1 is to be turned on next time. Therefore, during a period when the switching element F1 is off after being on, the signal f outputted from the comparison circuit 22 is kept at L level. Thus, the signal k outputted form the output terminal Q of the FF 28 is kept at L level. As a result, the signal 1 outputted from the EXOR circuit 60 becomes H level during a period when the switching element F1 is off under the PWM control indicated by the signal j. Since the falling timing of the signal j is later than the falling timing of the clock signal b, the signal 1 falls after the signal m rises. Therefore, the signal n outputted from the AND circuit 41 is H level during a period when both the signals 1 and m are H level. Since the signal n becomes H level, the signal o outputted from the inverting output terminal /Q of the FF 30 becomes L level. As a result, all the signals outputted from the AND circuits 44 to 47 become L level, and all the switching elements F1 to F4 are kept off.

Figure 4:
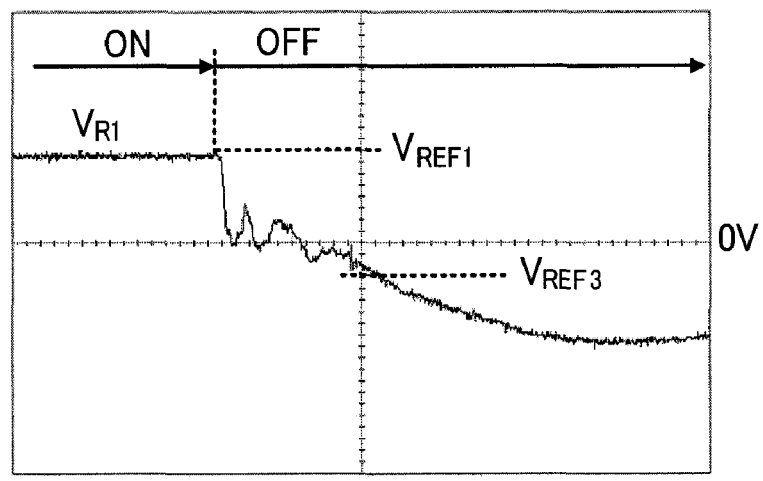

Therefore, in the motor driving device 10, when a negative current greater in absolute value than a predetermined set value is not passed through the parasitic diode of the switching element F2 during a period when the switching element F1 is off after being on, it is determined that the coil L2 is disconnected from the motor driving device 10, and the switching elements F1 to F4 are kept off. The same applies to the switching elements F2 to F4. Thus, as shown in FIG. 4, for example, in a motor specification, in the case where drop in the voltage $V_{R1}$ is slow when the switching element F1 is turned off after being on, it is determined that the coil L2 is disconnected not based on whether or not an avalanche current having a level greater than a predetermined level flows after a predetermined time has elapsed since the switching element F1 was turned off after being on, but based on whether or not a negative current greater in absolute value than a predetermined set value is passed during a period when the switching element F1 is off. Thus, false detection of the disconnection of the coil L2 can be prevented. That is, thermal destruction of the switching element can be prevented regardless of the motor specification.

It can be determined whether or not a negative current greater in absolute value than the predetermined set value is passed during a period when the switching element F1 is off, by generating at the resistor R1 the voltage $V_{R1}$ according to the current passed through the parasitic diode of the switching element F2 and detecting whether or not the voltage $V_{R1}$ has become lower than the negative voltage $V_{REF3}$ of a predetermined level.

Also, the reference voltage $V_{REF3+}$ of a positive level according to the reference voltage $V_{REF3}$ is compared with a voltage obtained by level-shifting the voltage $V_{R1}$, which is to become the negative level, to a positive voltage by a level-shift circuit made up of the resistors R3 and R4, so that it can be detected whether the voltage $V_{R1}$ has become lower than the negative voltage $V_{VREF3}$ of the predetermined level. That is, the voltage $V_{R1}$, which is to become the negative level, and the reference voltage $V_{REF3}$ of the negative level can be compared, using a comparison circuit capable of comparing voltages of the positive level.

Figure 5:
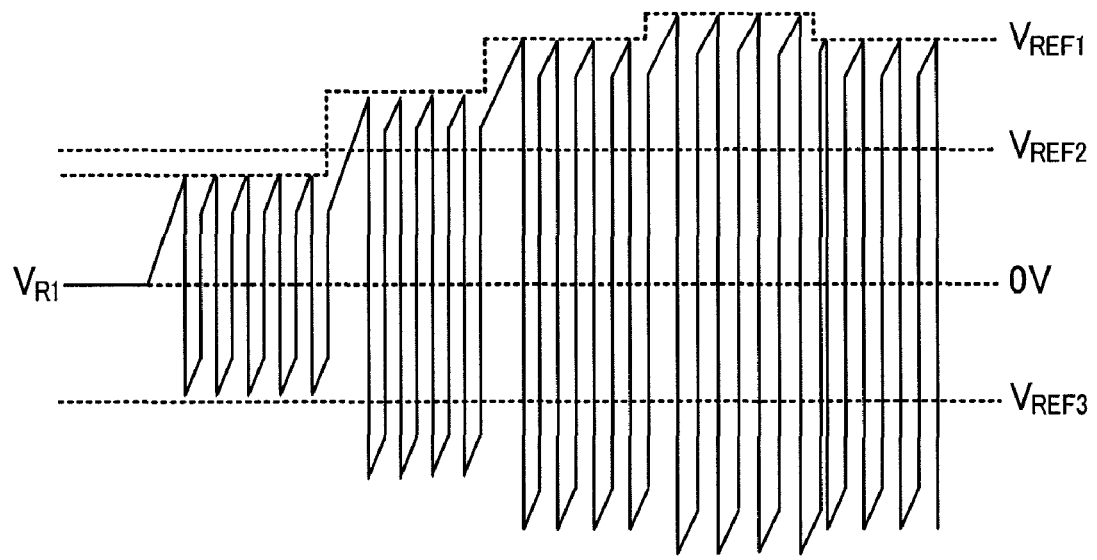
FIG. 5 is a diagram illustrating an example of a current change by microstepping driving.
Figure 6:
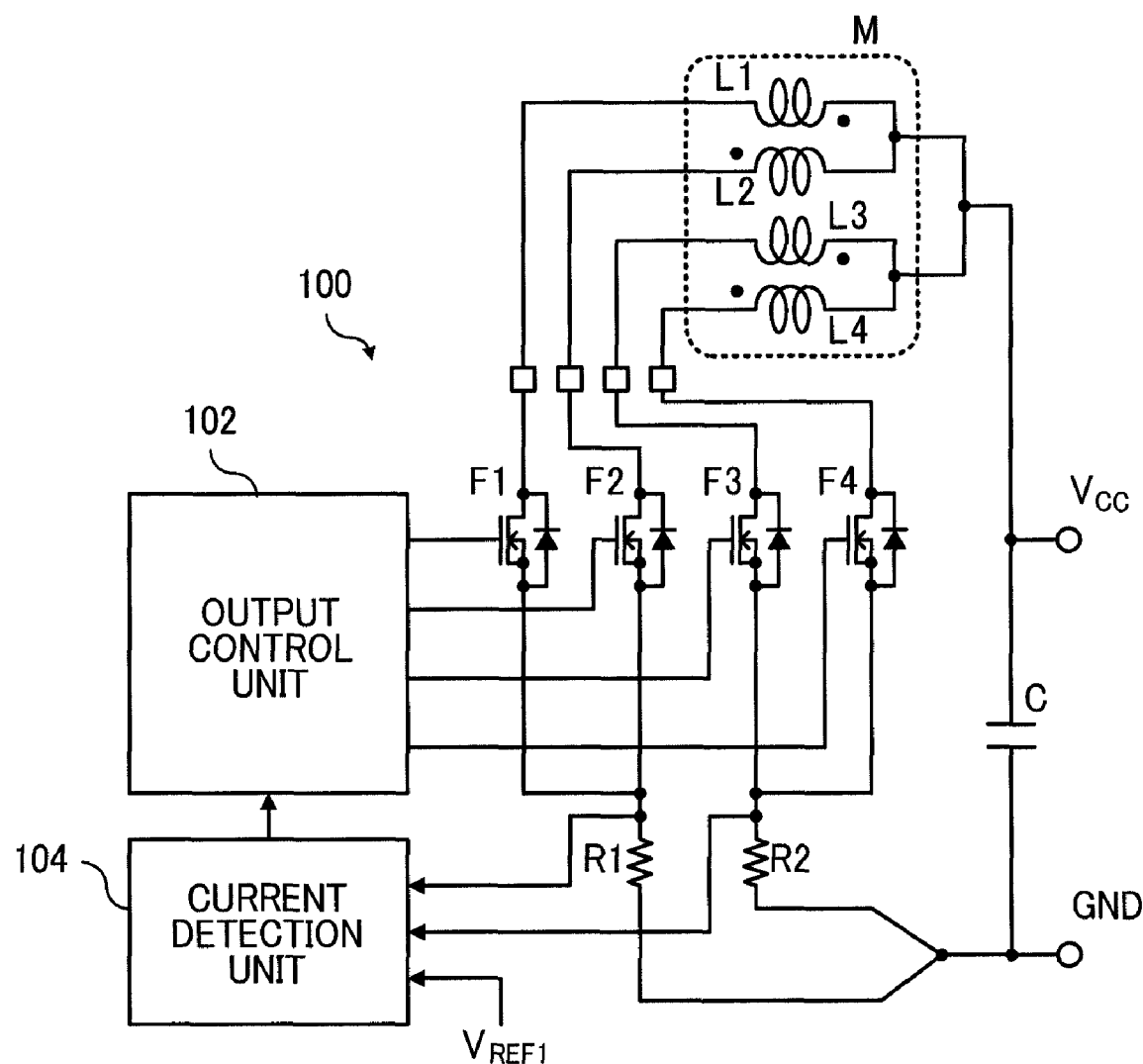
FIG. 6 is a diagram illustrating an example of a general motor driving device for driving a two-phase stepping motor.
Figure 8:
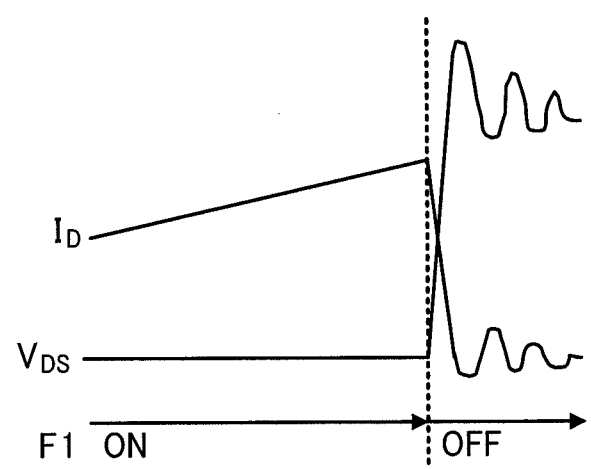
FIG. 8 is a diagram illustrating an example of a change in current and voltage according to a state of a switching element when a coil is normally connected.
Figure 9:
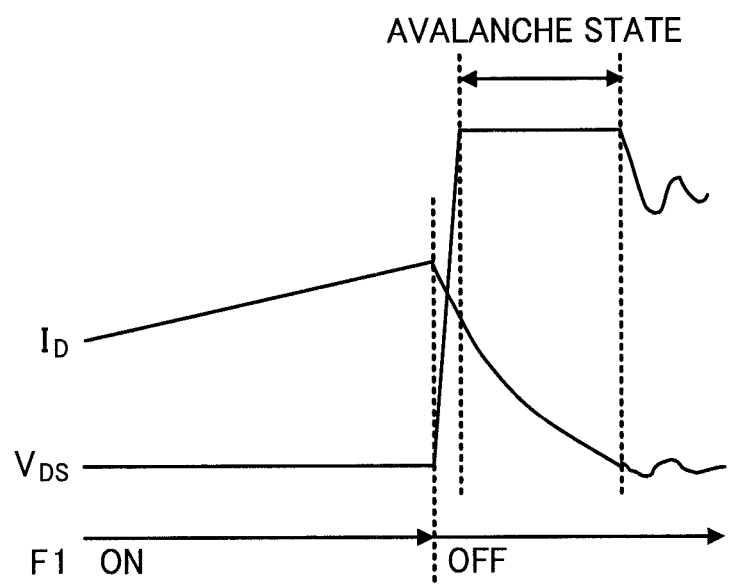
FIG. 9 is a diagram illustrating an example of a change in current and voltage according to a state of a switching element when a coil is disconnected.
Figure 10:
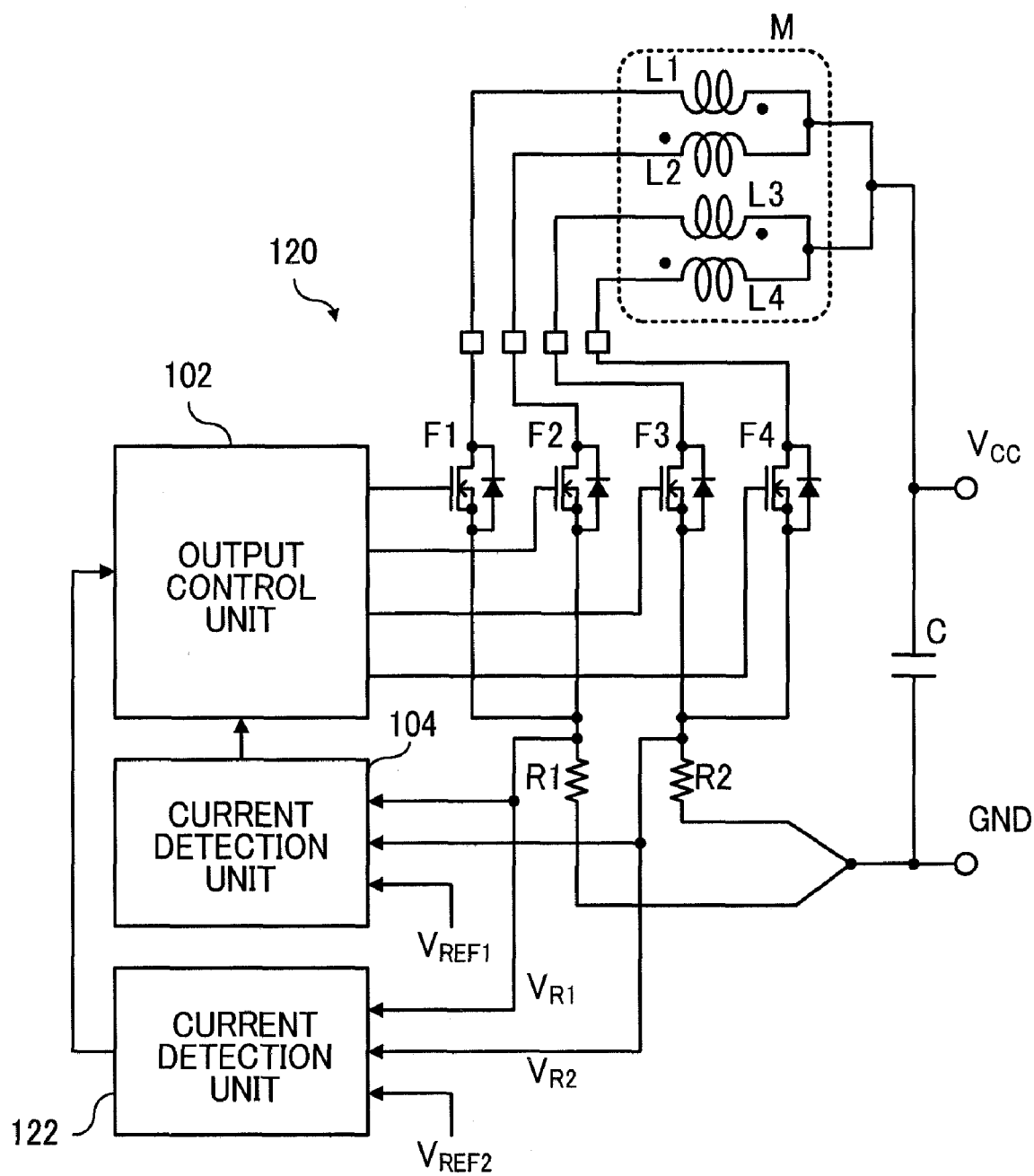
FIG. 10 is a diagram illustrating a configuration example of a motor driving device having a function of preventing thermal destruction of a switching element.
Figure 11:
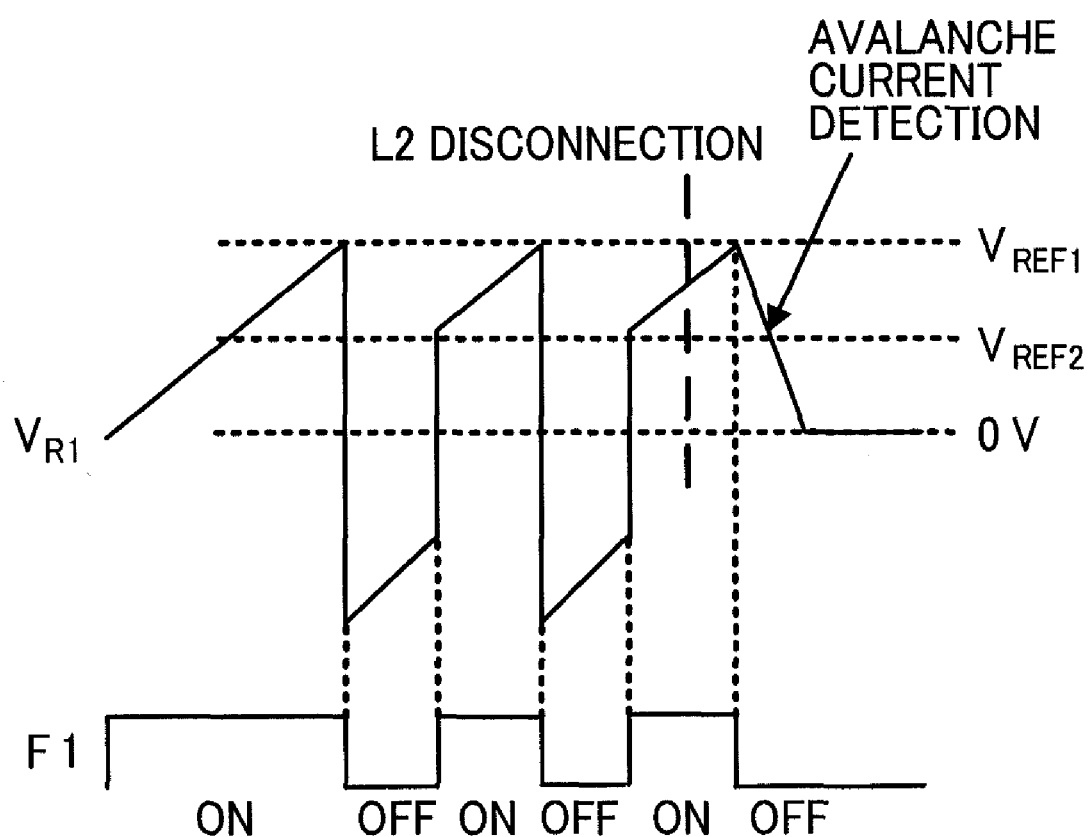
FIG. 11 is a timing chart illustrating an example of an operation of detecting an avalanche state.
Figure 12:
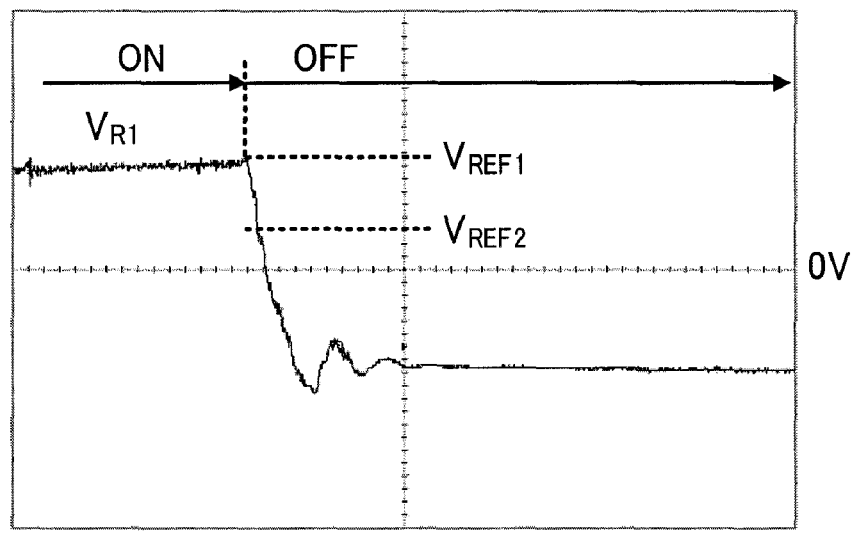
FIG. 12 is a diagram illustrating an example of a current change in a case of a hybrid motor.
Figure 13:
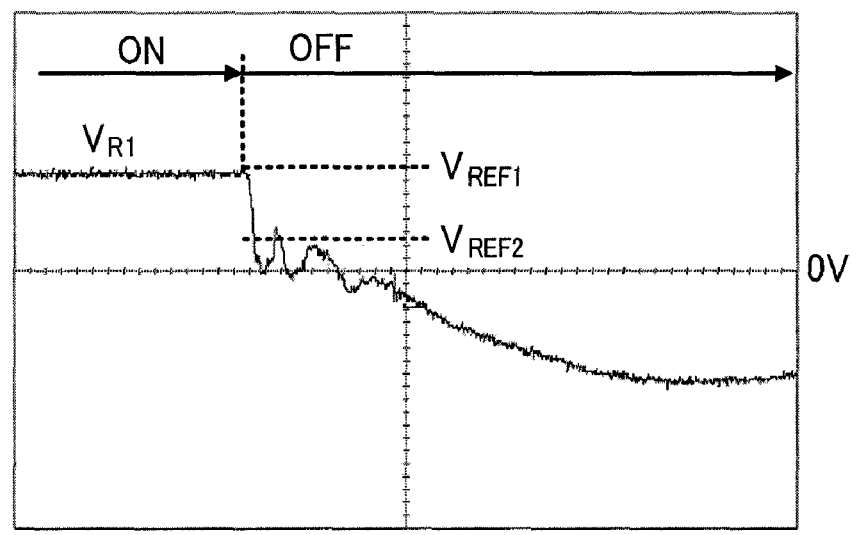
FIG. 13 is a diagram illustrating an example of a current change in a case of a PM motor.

Moreover, in the motor driving device 10, when the maximum value of a current passed through the coil during a period when the switching element is on is smaller than the absolute value of a detected level of the negative current passed during a period when the switching element is off after being on, determination whether or not the coil is disconnected is not made. That is, as shown in FIG. 5, when the maximum value of a current passed through the coil is changed in a stepped manner by micro-stepping driving, the absolute value of the negative current generated during a period when the switching element is off becomes small even if the coil is normally connected, in a period when the maximum value of a current passed through the coil is small. Thus, by not making determination during such a period whether or not the coil is disconnected, false detection of the disconnection of the coil can be prevented.

It can be determined whether or not the maximum value of the current, passed through the coil during a period when the switching element is on, is smaller than the absolute value of a detected level of the negative current passed in a period during which the switching element is off after being on, by comparing the voltage $V_{R1}$ with the positive reference voltage $V_{REF2}$ greater in absolute value than the reference voltage $V_{REF3}$.

The above embodiments of the present invention are simply for facilitating the understanding of the present invention and are not in any way to be construed as limiting the present invention. The present invention may variously be changed or altered without departing from its spirit and encompass equivalents thereof.

For example, in an embodiment of the present invention, it is assumed that when the switching element L1 is turned off after being on, the regeneration current is passed through the parasitic diode of the switching element F2, for example, but the regeneration current may be passed through the switching element F2 by the switching element F2 being turned on when the switching element F1 is turned off after being on. In this case, the switching element F2 corresponds to the rectifier element for passing the regeneration current. Also, instead of the parasitic diode of the switching element, a rectifier element, such as a diode, for passing the regeneration current may be separately provided.

What is claimed is:

1. A motor driving device comprising:
a switching element having one end connected to one end of a first coil of a stepping motor including the first coil and a second coil, and having the other end connected to a ground side, the switching element configured to control a current passed through the first coil, the other end of the first coil and one end of the second coil electromagnetically coupled and connected to a power source side;
a rectifier element having one end connected to the other end of the second coil, and having the other end connected to the ground side, the rectifier element configured to be energized in a direction from the ground side toward the second coil;
a coil current detection unit configured to detect a current passed through the first coil;
a regeneration current detection unit configured to detect a current passed through the rectifier element;
a control unit configured to turn on the switching element at predetermined intervals, and turn off the switching element when the current passed through the first coil reaches a predetermined set current based on a detection result of the coil current detection unit; and
a negative current detection unit configured to detect whether or not a negative current greater in absolute value than a predetermined set value is passed through the rectifier element based on a detection result of the regeneration current detection unit during a period when the switching element is off after being on,
the control unit keeping the switching element off when the negative current is not passed therethrough, based on a detection result of the negative current detection unit.

2. The motor driving device according to claim 1, wherein the regeneration current detection unit has one end connected to the other end of the rectifier element, and has the other end connected to the ground side, and includes a first resistor generating a first detection voltage according to a current passed through the rectifier element; wherein
the control unit turns off the switching element when the first detection voltage reaches a voltage of a predetermined level according to the set current, during a period when the switching element is on; wherein
the negative current detection unit detects whether or not the first detection voltage has become lower than a negative voltage of a predetermined level according to the negative current, during a period when the switching element is off after being on; and wherein
the control unit keeps the switching element off when the first detection voltage does not become lower than the negative voltage.

3. The motor driving device according to claim 2, wherein the negative current detection unit includes:
a level-shift circuit configured to level-shift the first detection voltage so as to be decreased according to decrease of the first detection voltage, and so as to become a positive voltage of a predetermined level when the first detection voltage is the negative voltage; wherein
a comparison circuit configured to compare the level-shifted first detection voltage with the positive voltage; and wherein a stop-signal output circuit configured to output a stop signal for stopping switching of the switching element when the level-shifted first detection voltage does not become lower than the positive voltage during a period when the switching element is off after being on, based on a detection result of the comparison circuit, wherein
the control unit keeps the switching element off when the stop signal is outputted.

4. The motor driving device according to claim 1, further comprising
a set-current detection unit configured to detect whether or not the set current is greater in absolute value than the negative current, the set current being variable, wherein
the control unit
keeps the switching element off when the negative current is not passed during a period when the set current is greater in absolute value than the negative current, and
turns on the switching element at the predetermined intervals regardless of a detection result of the negative current during a period when the set current is smaller in absolute value than the negative current,
based on a detection result of the set-current detection unit and the detection result of the negative current detection unit.

5. The motor driving device according to claim 4, wherein the coil current detection unit has one end connected to the other end of the switching element, has the other end connected to the ground side, and includes a second resistor generating a second detection voltage according to a current passed through the first coil; wherein
the set-current detection unit detects whether or not the second detection voltage exceeds a voltage of a predetermined level higher than the second detection voltage when the current passed through the first coil is the set current, during a period when the switching element is on; and wherein
the control unit
keeps the switching element off when the second detection voltage exceeds the voltage of the predetermined level during a period when the switching element is on and when the negative current is not passed during a period when the switching element is off after being on, and
turns on the switching element at the predetermined intervals regardless of the detection result of the negative current when the second detection voltage does not exceed the voltage of the predetermined level during a period when the switching element is on,
based on the detection results of the set-current detection unit and the negative current detection unit.

* * * * *